United States Patent [19]

Kanda et al.

[11] Patent Number: 5,135,649
[45] Date of Patent: Aug. 4, 1992

[54] COLUMN PACKING MATERIAL WITH BOTH HYDROPHOBIC AND HYDROPHILIC GROUPS AND PROCESS FOR PRODUCTION THEREOF

[75] Inventors: Taketoshi Kanda; Atsuo Sakamoto; Tadao Ohta; Yutaka Ohtsu, all of Yokohama, Japan

[73] Assignee: Shiseido Company Ltd., Tokyo, Japan

[21] Appl. No.: 588,044

[22] Filed: Sep. 25, 1990

[30] Foreign Application Priority Data

Oct. 2, 1989 [JP] Japan .................................. 1-257288
Mar. 30, 1990 [JP] Japan .................................. 2-83618

[51] Int. Cl.$^5$ ............................................. B01D 15/08
[52] U.S. Cl. .............................. 210/198.2; 210/502.1; 210/635; 210/656; 502/401; 502/402; 502/439
[58] Field of Search ................ 210/198.2, 656, 635, 210/502.1; 55/67; 524/862, 863, 865; 556/450, 452, 453, 464; 502/401, 402, 439, 407, 415, 400

[56] References Cited

U.S. PATENT DOCUMENTS

| | | | |
|---|---|---|---|
| 3,795,313 | 3/1974 | Kirkland et al. ................ | 210/198.2 |
| 4,384,954 | 5/1983 | Nakashima et al. ............ | 210/502.1 |
| 4,544,485 | 10/1985 | Pinkerton et al. .............. | 210/656 |
| 4,743,377 | 5/1988 | Ohtsu et al. .................... | 210/656 |
| 4,746,572 | 5/1988 | Glajch et al. ................... | 210/656 |
| 4,941,974 | 7/1990 | Williams ......................... | 210/198.2 |
| 4,950,635 | 8/1990 | Williams et al. ................ | 210/198.2 |
| 5,039,419 | 8/1991 | Bradshaw et al. .............. | 210/198.2 |

FOREIGN PATENT DOCUMENTS

| | | | |
|---|---|---|---|
| 0050167 | 10/1980 | European Pat. Off. ......... | 210/198.2 |
| 0207784 | 1/1987 | European Pat. Off. ......... | 210/656 |
| 0269447 | 6/1988 | European Pat. Off. ......... | 210/656 |
| 60-562564 | 4/1985 | Japan . | |
| 61-65159 | 4/1986 | Japan . | |
| 1-123145 | 5/1989 | Japan . | |
| 2-59415 | 2/1990 | Japan . | |
| 2074892 | 11/1981 | United Kingdom ............ | 210/198.2 |

OTHER PUBLICATIONS

V. Bázant, V. Chvalovsky, and J. Rathousky, "Organosilicon Compounds", Academic Press, New York, NY (1965) pp. 212, 222.

Primary Examiner—W. Gary Jones
Assistant Examiner—Sun Uk Kim
Attorney, Agent, or Firm—Wegner, Cantor, Mueller & Player

[57] ABSTRACT

A column packing material comprising a porous support coated with a silicone polymer having an Si—R bond, wherein R is a hydrocarbon group having 1 to 18 carbon atoms, and an Si—R' bond, wherein R' is a hydrophilic group having one or more of polyoxyalkylene group or hydroxyl group at the terminal end, of which column packing material is produced by:

modifying a porous support by bonding hydrocarbon groups to the porous support;

eliminating a part of the hydrocarbon groups from the modified porous support; and modifying the porous support by bonding hydrophilic groups thereto.

9 Claims, No Drawings

COLUMN PACKING MATERIAL WITH BOTH HYDROPHOBIC AND HYDROPHILIC GROUPS AND PROCESS FOR PRODUCTION THEREOF

BACKGROUND OF THE INVENTION

1. Field of the Invention

The present invention relates to a column packing material and a process for producing the same. More specifically, it relates to an improvement in the modification step of the active group.

2. Description of the Related Art

Currently, columns packed with packing materials are used for a separation of various liquid samples, and a liquid chromatography, particularly a high performance liquid chromatography (HPLC), is frequently used for a separation and analysis of a sample of a mixture of various substances such as serum, etc., and industrially, column packing materials are applied for a separation and extraction of specific components.

In the prior art, when drugs or metabolites in the biological components containing a large amount of proteinaceous components such as serum are to be quantitated by HPLC, to remove difficulties caused by an adsorption of proteins onto the packing material, a pre-treatment such as protein removal is required.

This pre-treatment operation, however, requires much time and labor, and has a problem in that it lowers the precision of the analysis.

Accordingly, column packing materials have been developed which allow a direct injection of a sample containing proteinaceous components, without the need for the protein removal operations, to thereby enable a separation of the various components contained in the sample.

These improved column packing materials employ a porous glass or silica gel as the support, and have different properties imparted inside or outside of the micro pores thereof.

Due to the use of these packing materials, since proteins in a serum (e.g., albumin or globulin) are macromolecules, they do not penetrate the micro pores and are not adsorbed on the hydrophilic outer surface (i.e., pore outer surface), but pass the column as is, but molecules of drugs with relatively smaller sizes are adsorbed on the hydrophilic inner surface (i.e., pore inner surface), to be thus separated in the serum.

Examples of such packing materials are those described in Japanese Unexamined Patent Publication (Kokai) No. 60-56256. In this packing material, a protein is coated on the outer surface of a silica chemically bound with octadecyl (ODS) groups. The coated protein comprises a bovine serum albumin or house rabbit plasma protein, and a packing material is obtained by adsorbing the protein onto the ODS-bound silica and modifying same.

Of the packing materials as mentioned above, however, problems arise with regard to the durability and separation ability of the ODS silica packing material coated with a protein; namely, the adsorbed and modified protein may be eluted when used over a long term, and a column having a high separation efficiency can not be obtained.

To solve these problems, a method has been developed whereby a column as described in Japanese Unexamined Patent Publications (Kokai) Nos. 61-65159 and 1-123145 is obtained, by:

(1) introducing hydrophilic groups into the inner surface and the outer surface of a porous support;

(2) cleaving only the hydrophilic groups on the outer surface by using an enzyme which is itself a macromolecule and cannot penetrate the micro pores of silica; and (3) introducing hydrophilic groups into the outer surface.

More specifically, in the method described in Japanese Unexamined Patent Publication (Kokai) No. 61-65159, by using a porous silica having glycerylpropyl groups introduced therein as the starting material, and an oligopeptide (e.g., glycylphenylalanyl-phenylalanine) bound thereto through carbonyl-diimidazole and hydrolyzed by using carboxypeptidase A, which is a protein hydrolase, the phenylalanine side chain is cleaved on the outer surface.

As a result, glycyl-phenylalanyl-phenylalanine remains as the hydrophobic ligand on the inner surface of the filler, and the outer surface becomes a hydrophilic glycyl-glycerylpropyl group.

Further, in the method described in Japanese Unexamined Patent Publication (Kokai) No. 1-123145, a porous silica having an aminopropyl group introduced therein is used as the starting material, and reacted with octanoyl chloride in the presence of triethylamine to introduce a hydrophobic group through the amide bond, the acyl group on the outer surface is then hydrolyzed with polymyxin acylase, and the amino groups on the outer surface are made hydrophilic by carrying out the reaction with glycidol.

Nevertheless, in the method described in Japanese Unexamined Patent Publication (Kokai) No. 61-65159 or 1-123145, since an enzymatic reaction is utilized the steps are complicated, and further, the characteristics of the packing material are apt to be varied.

Also, these packing materials have problems in that the pH of the eluent is limited to a narrow range, and that it is difficult to obtain stable and reliable measurement results.

SUMMARY OF THE INVENTION

Accordingly, the objects of the present invention are to eliminate the above-mentioned disadvantages of the prior art and to provide a packing material for a column which can be easily produced and has a high separation ability, and a process for producing the same.

Other objects and advantages of the present invention will be apparent from the following description.

In accordance with the present invention, there is provided a column packing material comprising:

(i) a silicone polymer having an Si—R bond, wherein R is a hydrocarbon group having 1 to 18 carbon atoms and an Si—R' bond, wherein R' is a hydrophilic group having one or more of polyoxyalkylene group or hydroxyl group at the terminal end, and;

(ii) a porous supported coated therewith.

In accordance with the present invention, there is also provided a process for producing a column packing material comprising:

a hydrocarbon group modifying step of bonding hydrocarbon groups to a porous support;

a hydrocarbon group eliminating step of eliminating a part of the hydrocarbon groups; and a hydrophilic group modifying step of bonding hydrophilic groups.

DESCRIPTION OF THE PREFERRED EMBODIMENT

As mentioned above, according to the present invention, the surface of a porous support is modified with a hydrophobic group and a hydrophilic group, whereby a column packing material with a very high separation ability of a protein-containing sample can be obtained.

The constitution of the present invention is now described in detail, as follows.

As the porous support to be used in the present invention, there can be employed, for example, silica gel, alumina, glass beads (e.g., porous glass), zeolite, hydroxyapatite, or graphite; namely, any powder generally employed as the support for chromatography. Also, a composite powder, such as a powder coated with a fine inorganic powder, for example, silica gel, titanium oxide or hydroxyapatite, on the surface of a synthetic resin such as polyamide, acrylic resin, or polyvinyl alcohol, can be employed.

The porous support preferably has an average particle size of 2 to 200 μm, a specific surface area of 200 to 800 m$^2$/g (determined by a BET method using N$_2$ gas), and micro pores of 40 Å to 120 Å.

A particularly preferable porous support is a spherical or crushed type silica gel having micro pores of 60 Å to 80 Å, a specific surface area of 400 to 600 m$^2$/g, and a particle size of 3 to 50 μm.

Also, to obtain the column packing material according to the present invention, preferably the procedures as described below are carried out.

Silicone polymer coating step

A silicone compound having a Si—H group is brought into contact with the porous support as described above, to effect a surface polymerization.

Hydrocarbon group modifying step

By reacting a hydrocarbon having a vinyl group in the molecule with the remaining Si—H groups, or by converting Si—H groups into Si—OH with, for example, ammonia, and reacting trialkyl-chlorosilane therewith, a support partially coated over the whole surface thereof with a silicone compound having an alkyl group is obtained.

Hydrocarbon group eliminating step

Then, by reacting a Lewis acid with the support, under specific conditions, the alkyl groups on a part of the surface of the powder, particularly on the outer surface thereof, are cleaved.

Hydrophilic group modifying step

Next, hydrophilic groups are introduced through the reaction with, for example, γ-glycidoxypropylmethoxysilane.

The silicone compound having a Si—H group usable in the present invention is at least one of the formula (I):

wherein R$^1$, R$^2$ and R$^3$ are each independently a hydrogen atom or a hydrocarbon group having 1 to 10 carbon atoms which may be substituted with at least one halogen atom, with a proviso that R$^1$, R$^2$ and R$^3$ cannot be hydrogen atoms at the same time; R$^4$, R$^5$ and R$^6$ are each independently a hydrogen atom or a hydrocarbon group having 1 to 10 carbon atoms which may be substituted with at least one halogen atom; a is an integer of 0 or one or more, b is an integer of 0 or one or more, and c is 0 or 2, with a proviso that, when c is 0, the sum of a and b is an integer of 3 or more.

The silicon compound (I) consists of the following two kinds of groups.

The first groups corresponds to the case where c=0 in the above formula (I), which is a cyclic silicon compound represented by the formula (II):

$$(R^1HSiO)_a(R^2R^3SiO)_b \qquad (II)$$

wherein R$^1$, R$^2$, R$^3$, a and b have the same meanings as defined above, but preferably R$^1$, R$^2$ and R$^3$ are each independently a hydrocarbon group having 1 to 10 carbon atoms which may be substituted with at least one halogen atom, and the sum of a and b is 3 or more. Representative examples of this compound are as shown below.

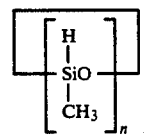
(A)

wherein n represents an integer of 3 to 300

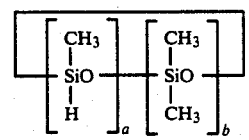
(B)

wherein a+b=3 to 300.

The compounds (A) and (B) set forth above can be used alone or as a mixture thereof.

In the respective formulae of the above (A) and (B), n (or a+b) is preferably 3 to 7. Since the boiling point will be lowered as the value of n grows smaller, the amount adsorbed on the support through vaporization will be increased. Trimers and tetramers are particularly suitable, because they can be readily polymerized due to their steric properties.

Specific examples of the cyclic silicone compound (II) include dihydrogenhexamethylcyclotetrasiloxane, trihydrogenpentamethylcyclotetrasiloxane, tetrahydrogentetramethylcyclotetrasiloxane, dihydrogenoctamethylcyclopentasiloxane, trihydrogenheptamethylcyclopentasiloxane, tetrahydrogenhexamethylcyclopentasiloxane, and pentahydrogenpentamethylcyclopentasiloxane.

The second group of the silicone compounds of the above formula (I) corresponds to the case where c=2 in the above formula (I), which is a straight silicone compound represented by the formula (III):

wherein R$^1$, R$^2$, R$^3$, R$^4$, R$^5$, R$^6$, a and b have the same meanings as defined above, and c is 2, but preferably R$^1$-R$^6$ are each independently a hydrocarbon group having 1 to 10 carbon atoms which may be substituted with at least one halogen atom. As representative examples of this compound, the compounds represented by the following formula (D) can be included:

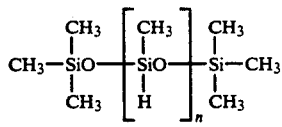

(D)

wherein n represents an integer of 2 to 100.

Examples of the straight silicone compounds of the above formula (III) include 1,1,1,2,3,4,4,4-octamethyltetrasiloxane, 1,1,1,2,3,4,5,5,5-nonamethylpentasiloxane, and 1,1,1,2,3,4,5,6,6,6-decamethylhexasiloxane.

The silicone compound (I) is brought into contact with the above-described porous support in a gas phase state or liquid phase state. The contact in the gas phase state (gas phase treatment) can be carried out by, for example, the method in which a sealed vessel is employed and the vapor of the above silicone compound is brought into contact, in the molecular state, with the support surface at a temperature of 120° C. or lower, preferably 100° C. or lower, and under a pressure preferably of 200 mmHg or lower, more preferably 100 mmHg or lower, or the method in which a gas mixture of the above silicone compound and a carrier gas is brought into contact with the support at a temperature of 120° C. or lower, preferably 100° C. or lower. As the silicone compound suitable for the gas phase treatment, for example, tetrahydrotetraethylcyclotetrasiloxane, tetrahydrotetramethylcyclotetrasiloxane can be included.

Further, the contact in the liquid phase state (liquid phase treatment) may be carried out by, for example, adding 1 to 50% by weight of a silicone compound solution dissolved in a volatile solvent which can dissolve the above-mentioned silicone compound, such as benzene, dichloromethane, or chloroform, particularly hexane, to an amount of 0.01 to 1 part by weight per 1 part by weight of the carrier. In this case, the addition is preferably done while stirring.

The surface polymerization of the silicone compound on the support surface can be carried out by leaving the support after the contact treatment as mentioned above to stand, or by stirring it at a temperature of 50° to 200° C. for 2 hours or longer.

Since the surface polymerization is promoted by the action of the surface active points of the support itself, the addition of a catalyst is not particularly required. Here, "active point" refers to the site which can catalyze a polymerization of the silicone compound having a siloxane bond (Si—O—Si) or Si—H (hydrosilyl) group, and means, for example, an acid point, base point, oxidation point, or reduction point. The surface polymerization is carried out until the active points on the support surface are covered with the coating of a silicone polymer. When the activity of the support itself is very weak, an alkali catalyst such as sodium hydroxide, potassium hydroxide, lithium hydroxide, ammonium hydroxide or calcium hydroxide, or an alkyl metal catalyst such as dibutyl tin, may be added to the support after the above-described contact treatment and before carrying out the polymerization.

The structure of the silicone polymer coating covering the support surface includes two types. That is, the silicone polymer which is polymerized by a cleavage and recombination of a siloxane bond (—Si—O—Si), has only the chain structure of —Si—O—Si— units, but when the polymerization occurs through a mutual crosslinking reaction between the hydrosilyl bond (S—H) in the presence of $H_2O$ or $O_2$, the silicone polymer will contain a network structure having the unit:

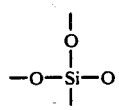

derived from:

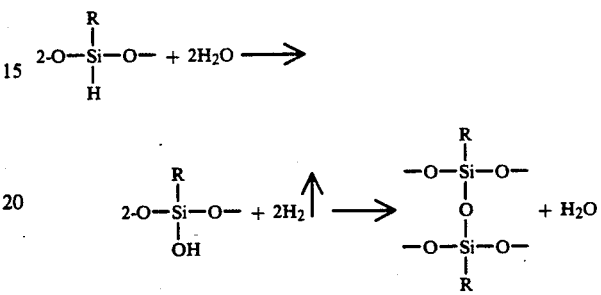

The polymerization of the two different types as mentioned above may be carried out separately, or both types of polymerizations may proceed simultaneously, depending on the kind of support, the reaction conditions (temperature, catalyst, etc.), and the extent of these polymerizations can be varied.

As described above, in the present invention, since a silicone compound having a low molecular weight is brought into contact with the support, the silicon compound will penetrate the inner portions of micro pores of the carrier, to be attached or adsorbed onto and substantially over the whole surface of the powder, and polymerized there, whereby a very thin coating of a silicone polymer (coating of 3 Å to 30 Å) is formed on the support and the porous characteristic of the support is maintained substantially as before. This porous characteristic will not be substantially changed even by a subsequent addition of a vinyl compound.

The molecular weight (weight average molecular weight) of the silicone polymer formed on the support surface according to the polymerization reaction as described above is 150,000 or more. In the case of a silicone compound, however, as it becomes a higher polymer during the course of the polymerization, it will become more difficult to dissolve same in water or an organic solvent, and therefore, the molecular weight cannot be measured by an extraction of the polymer, and it is impossible to measure the molecular weight of the polymer while coated on the support surface.

Accordingly, when the polymers at the respective steps during the polymerization were extracted with chloroform and the molecular weights of the polymers calculated on polystyrene are determined, it was confirmed that a polymer with a molecular weight of 150,000 at maximum existed. Therefore, the polymer sufficiently polymerized when not extracted with chloroform is considered to have a molecular weight of 150,000 or higher; a more detailed confirmation of the molecular weight thereof is difficult.

Also, unreacted Si—H groups remain in the silicone polymer covering the carrier surface, and by allowing a hydrocarbon group having a vinyl group to coexist with the Si—H groups, a silicone polymer having an Si—hydrocarbon bond can be formed.

As the above-mentioned vinyl compound, for example, compounds represented by the formula:

$$R^8-CH=CH-R^9$$

wherein $R^8$ and $R^9$ are each independently a hydrogen atom, an alkyl group having 1 to 40 carbon atoms, a cycloalkyl group or cycloalkenyl group having 4 to 8 carbon atoms, or an aryl group, which may be substituted with an alkyl group, having 1 to 20 carbon atoms, can be used.

The vinyl compound represented by the above formula may be either ethylene, wherein $R^8$ and $R^9$ are both hydrogen atoms, a vinyl compound wherein one of $R^8$ and $R^9$ is a hydrogen atom and the other is a substituent other than hydrogen atom, such as an α-olefinic compound, a symmetric vinyl compound wherein $R^8$ and $R^9$ are the same substituents other than a hydrogen atom, or an asymmetric vinyl compound wherein $R^8$ and $R^9$ are different substituents other than a hydrogen atom.

Preferable vinyl compounds are those wherein in the above formula, $R^8$ and $R^9$ are each independently a hydrogen atom; an alkyl group having 4 to 20 carbon atoms such as 1-hexyl, 1-octyl, 1-decyl, 1-dodecyl, 1-hexadecyl, or 1-octadecyl group; cyclohexyl or cyclohexenyl group; phenyl or naphthyl group; or a phenyl or naphthyl group substituted with a lower alkyl group having 1 to 4 carbon atoms.

By an addition of a vinyl compound wherein $R^8$ is a hydrogen atom, and $R^9$ is an ethyl, hexyl, hexadecyl or phenyl group, a packing material corresponding to the $C_4$-type, $C_6$-type, $C_{18}$-type or phenyl type of chemical bonding type packing material of the prior art can be obtained.

The reaction between the above-described vinyl compound and the above-described silicone polymer coated powder can be carried out by, for example, placing them in contact in the presence of a solvent at 50° to 300° C. in a gas phase or liquid phase, for 2 hours or longer. As the catalyst, a platinum group catalyst, i.e., a compound of ruthenium, rhodium, palladium, osmium, iridium or platinum, is preferable, and particularly preferable are palladium compounds and platinum compounds.

The reaction can be confirmed by a measurement of the diffusion reflection spectrum, with an FT-IR device. Namely, the absorption intensity of the Si—H group at 2160 cm$^{-1}$ is reduced to a great extent by an addition of a vinyl compound, and instead, an absorption based on alkyl groups appears at 2800 cm$^{-1}$ to 3000 cm$^{-1}$. Accordingly, the reaction ratio can be calculated by determining the ratio of the absorption intensity.

The support coated with the silicone polymer having the Si-hydrocarbon bond thus obtained is itself useful as the packing material for liquid chromatography, and is available as commercial products (CAPCELL PAK $C_{18}$, the same $C_8$, the same PHENYL, from Shiseido Co., Ltd.).

To obtain the packing material for liquid chromatography according to the present invention, at least a part of the surface other than the micro pore portion of the silicone polymer coated support obtained as described above must be made hydrophilic, and accordingly, the two step treatments described below must be carried out.

(1) Cleavage of Si-hydrocarbon bond

A catalyst is added to the above silicone polymer coated support, and the mixture is subjected to refluxing and a reaction in an organic solvent.

As the catalyst, Lewis acids such as aluminum trichloride (AlCl$_3$), boron trifluoride (BF$_3$), and ferric tribromide (Fe Br$_3$), etc., are included.

The organic solvent may be one which does not react with the catalyst, and is preferably carbon disulfide, or a hydrocarbon type solvent such as toluene, benzene, and hexane. By this reaction, a reactive group with the silane coupling agent is formed on the surface of the support, as described below in (2).

(2) Addition reaction of hydrophilic group

The support obtained in the above (1) is added to an organic solvent solution of a coupling agent such as γ-glycidoxypropyltrimethoxysilane, γ-glycidoxypropylmonomethyldichlorosilane, γ-glycidoxypropyldimethylmonochlorosilane, 3,4-epoxybutanemonomethyldichlorosilane, 3,4-epoxybutanetriethoxysilane, and di-γ-glycidoxypropyldichlorosilane, and by carrying out the reaction under reflux, an addition of hydrophilic groups is effected until the indicator (Methyl Red) solution no longer indicates red. Further, if necessary, (for example, in the case of γ-glycidoxypropyltrimethylsilane) the reaction may be carried out such that the epoxy ring at the terminal end is opened with an aqueous perchloric acid solution to be converted to a hydroxyl group.

The packing material obtained as described above, which is different in type from the packing material of the prior art as characterized by the chemical bonding type, has an available pH range as broad as 2 to 10, can be used in an alkaline solvent which could not be utilized for the packing material of the prior art, and has a very good stability.

When drugs or metabolites in biological components such as plasma, etc., are quantitated by using the packing material according to the present invention, a precise analysis is made possible by directly injecting the biological components, to thereby eliminate cumbersome pre-treatments.

The column packing material according to the present invention is the resin capsule type having a silicone resin uniformly coated on a support, and therefore, is substantially free from the influence of the polar groups possessed by individual powders (e.g., the silanol group of silica gel).

Also, since at least a part of the outer surface of the packing material is hydrophilic, no adsorption of proteins, etc., occurs whereby a stable packing material having an excellent separation ability can be obtained.

EXAMPLES

The present invention will now be further illustrated in detail by, but is by no means limited to, the following Examples, wherein the amounts formulated are represented by % by weight.

EXAMPLE 1

A 10 g amount of a spherical silica gel powder having micro pores of about 60 Å and an average particle size of 5 μm, and 2 g of a cyclic silicone compound (in the formula (I), $R_1=CH_3$, a=3-5, b=0, c=0) were taken into separate sealed vessels which were linked to each other, and the cyclic silicone compound was subjected to nitrogen bubbling, to thereby cause it to come into contact in the gas phase state with the silica gel powder surface, to thus carry out a surface polymerization thereof.

Subsequently, the silica gel powder was taken out from the vessel and heated in a drying oven at 105° C. for 1 hour.

After cooling, the powder was taken into a 300 ml eggplant-shaped flask, and 1 mg of tri-n-octylmethylammonium salt of chloroplatinic acid as the catalyst and 50 ml of 1-octadecene were added thereto. The mixture was heated under reflux in an oil bath at 120° C. for 5 hours, then filtered by a glass filter (G-4), further washed with 100 ml of chloroform, and thereafter, dried in a drying oven at 105° C. for 1 hour.

Next, the dried powder was taken into a 300 ml eggplant-shaped flask, and 10 ml of 28% ammonia water and 90 ml of methanol were added thereto, followed by heating under reflux in a water bath for 5 hours. The mixture was filtered with a glass filter, subsequently washed with 50 ml of methanol and filtered, and then dried in a drying oven at 105° C. for 4 hours.

Next, 5 g of the powder obtained was taken, 1.33 g of aluminum chloride as the catalyst was added, and the mixture was heated under reflux in carbon disulfide for 30 minutes. The mixture was cooled, filtered, washed, and then dried at 60° C. and 2 mm/Hg for 5 hours. Next, the powder was added to a toluene solution of 15% γ-glycidoxypropyltrimethoxysilane, and the reaction was carried out under reflux for 16 hours. After the reaction, the mixture was filtered, washed thoroughly with toluene and then with acetone, followed by drying.

Next, water adjusted to pH 1.0–2.0 with perchloric acid was added to the powder, and the reaction was carried out while stirring at 80° C. for 4 hours. After the reaction, the product was thoroughly washed with water until the filtrate was no longer acidic, then washed with acetone and dried to give a packing material for liquid chromatography according to the present Example.

The above powder (3 g) was packed into a column made of a stainless steel and having an inner diameter of 4.6 mm and a length of 10 cm, by a packer and a pump, to prepare a packed column.

The packed column was connected to a high performance liquid chromatography, and a methanol/phosphate buffer (0.02M, pH=6.86)=10/90 was used as the mobile phase and allowed to flow at a flow rate of 1 ml/min. Human plasma (10 μl) was injected into the column and detected at 280 nm by a UV detector, to thereby obtain a chromatogram.

The peak area of the protein of the chromatogram obtained was found to be the same as the peak area of the protein of the chromatogram obtained by the same operations but using a stainless steel coil having an inner diameter of 0.6 mm and a length of 2 m instead of the present column, and therefore, it was found that the protein was not adsorbed on the packing material, but substantially 100% thereof was recovered.

Subsequently, a plasma containing a drug was measured, and two test liquids were prepared by adding 0.5 ml of a human plasma to 79.2 μg each of caffeine and theophylline, and were incubated at 37° C. for 3 hours. One test liquid is used as a sample for a direct injection (Sample 1), and the other sample is subjected to ultrafiltration to remove proteins, and only the free drug content measured. Namely, for a comparison with Sample 1, the sample (Sample 2) is used for a measurement of the amount of the drug bound to proteins.

Sample 1 and Sample 2 were applied to a high performance liquid chromatograph connected to the column packed with the packing material of the present invention, by the same method as described above, and detected at 254 nm by a UV detector to obtain chromatograms.

The results are shown in Table 1 and Table 2.

TABLE 1

| | Sample 1 | | |
|---|---|---|---|
| | Amount added (μg) | Measured value (μg) | Recovery (%) |
| Caffeine | 79.2 | 77.6 | 98.0 |
| Theophylline | 79.2 | 77.7 | 98.1 |

TABLE 2

| | Sample 2 | | | |
|---|---|---|---|---|
| | Amount added (μg) | Measured value (μg) | Free drug content (%) | Protein-bound drug content (%) |
| Caffeine | 79.2 | 51.4 | 64.9 | 35.1 |
| Theophylline | 79.2 | 24.9 | 31.4 | 68.6 |

As apparent from the above Table 1 and Table 2, the packing material according to the present invention does not adsorb proteins at all, and when drugs or metabolites in biological components such as serum and plasma, etc., are quantitated by use of a high performance liquid chromatograph, it is shown to be a packing material to which biological components can be directly injected without cumbersome pre-treatments.

EXAMPLE 2

An amount of 5 g of CAPCELL PAK C$_8$ (Shiseido Co., Ltd.) was taken, 0.8 g of aluminum chloride was added as the catalyst, and the mixture was heated under reflux in carbon disulfide for 30 minutes. After cooling, the mixture was filtered, washed and dried at 60° C. and 2 mm/Hg for 5 hours, the powder was added to a solution of 15% γ-glycidoxypropyltrimethoxysilane, and the reaction was carried out under reflux for 16 hours. After the reaction, the mixture was washed thoroughly with toluene, and then with acetone, followed by drying.

Next, water adjusted to a pH of 1.0–2.0 with perchloric acid was added to the powder, and the reaction was carried out while stirring at 80° C. for 4 hours. After the reaction, the product was thoroughly washed with water until the filtrate was no longer acidic, and then washed with acetone and dried to give a packing material for liquid chromatography according to the present invention.

Subsequently, a measurement of a plasma containing a drug was conducted by using the present column.

The present column was connected to a high performance liquid chromatograph, and a methanol/phosphate buffer (0.02M, pH=6.86)=2/98 was used as the mobile phase and allowed to flow at a flow rate of 1 ml/min. A test liquid having the same composition as Sample 1 used in Example 1 was directly injected and detected at 254 nm by a UV-detector, to obtain a chromatogram.

The results are shown below in Table 3.

TABLE 3

| | Sample 3 | | |
| --- | --- | --- | --- |
| | Amount added (μg) | Measured value (μg) | Recovery (%) |
| Caffeine | 79.2 | 78.1 | 98.6 |
| Theophylline | 79.2 | 78.3 | 98.9 |

We claim:

1. A column packing material comprising:
   (i) a silicone polymer having an Si—R bond, wherein R is a hydrocarbon group having 1 to 18 carbon atoms and an Si—R' group, wherein R' is a hydrophilic group having at least one group selected from the group consisting of polyoxyalkylene group and hydroxyl group at the terminal end thereof and;
   (ii) a porous support coated therewith.

2. A column packing material as claimed in claim 1, wherein the porous support is one of a silica gel, alumina, glass bead, zeolite, hydroxyapatite, and graphite.

3. A column packing material as claimed in claim 1, wherein the porous support is a composite powder comprising a synthetic resin coated with a fine inorganic powder.

4. A column packing material as claimed in claim 1, wherein the porous support has an average particle size of 2 to 200 μm.

5. A column packing material as claimed in claim 1, wherein the porous support has a specific surface area of 200 to 800 m²/g.

6. A column packing material as claimed in claim 1, wherein the porous support has a pore size of 40 Å to 120 Å.

7. A column packing material as claimed in claim 1, wherein the silicone polymer is obtained from a silicone compound having the formula (I):

$$(R^1HSiO)_a(R^2R^3SiO)_b(R^4R^5R^6SiO_{\frac{1}{2}})_c \quad (I)$$

wherein $R^1$, $R^2$ and $R^3$ are each independently a hydrogen atom or a hydrocarbon group having 1 to 10 carbon atoms which may be substituted with at least one halogen atom, with a proviso that $R^1$, $R^2$ and $R^3$ cannot be hydrogen atoms at the same time; $R^4$, $R^5$ and $R^6$ are each independently a hydrogen atom or a hydrocarbon group having 1 to 10 carbon atoms which may be substituted with at least one halogen atom; a is an integer of 0 or one or more, b is an integer of 0 or one or more, and c is 0 or 2, with a proviso that, when c is 0, the sum of a and b is an integer of 3 or more.

8. A process for producing a column packing material comprising:
   modifying a porous support by bonding hydrocarbon groups to the porous support;
   eliminating a part of the hydrocarbon groups from the modified porous support; and
   modifying the porous support by bonding hydrophilic groups thereto, wherein the porous support is coated with a silicone polymer.

9. A process as claimed in claim 8, wherein a treatment with a Lewis acid is carried out in the hydrocarbon group eliminating step to effect cleavage of Si-hydrocarbon bonds of said part of the hydrocarbon groups.

* * * * *